March 8, 1949.  P. A. BUCKY  2,463,514
REMINDER DEVICE
Filed Sept. 10, 1946  2 Sheets-Sheet 1
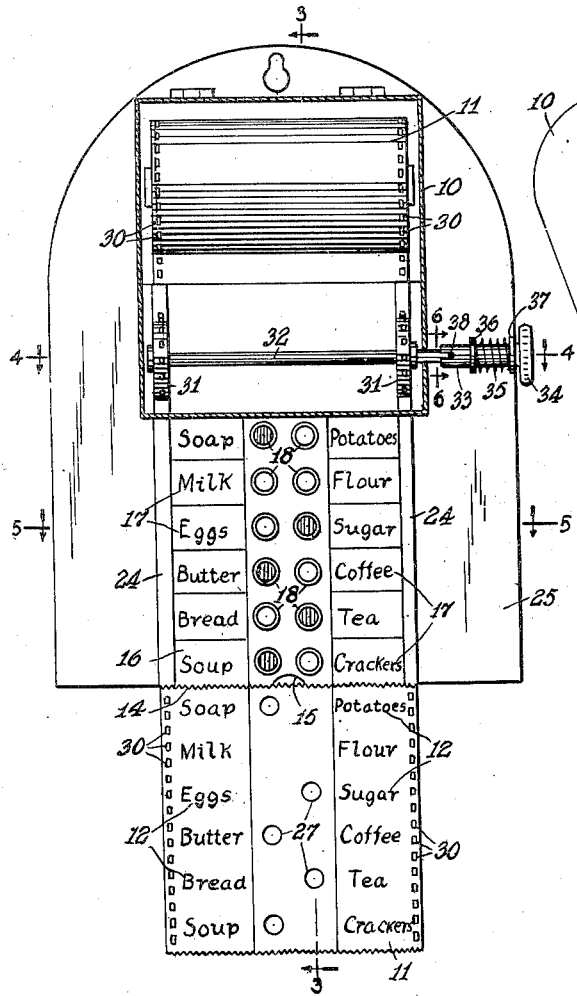
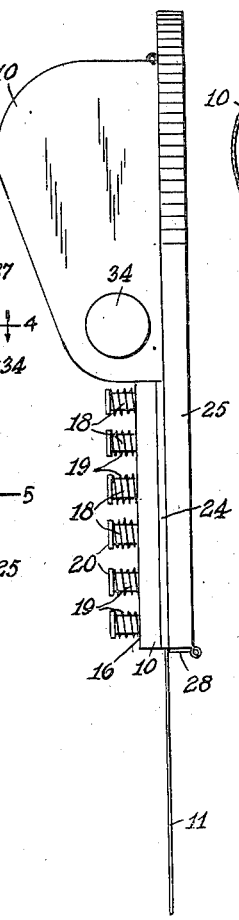
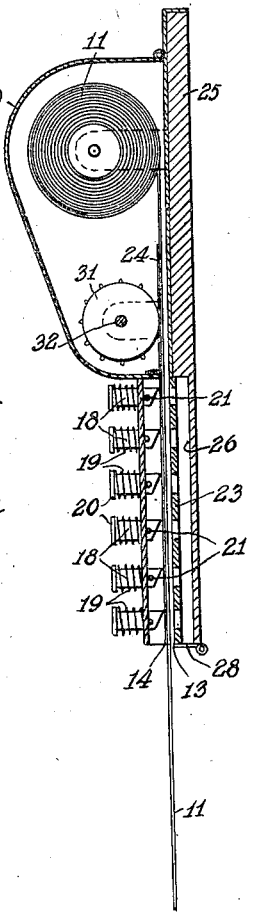
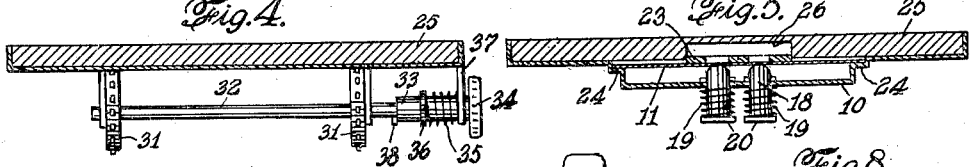
INVENTOR.
PETER A. BUCKY
BY
Fred'k F. Schuetz
ATTORNEY.

March 8, 1949.  P. A. BUCKY  2,463,514
REMINDER DEVICE
Filed Sept. 10, 1946  2 Sheets-Sheet 2
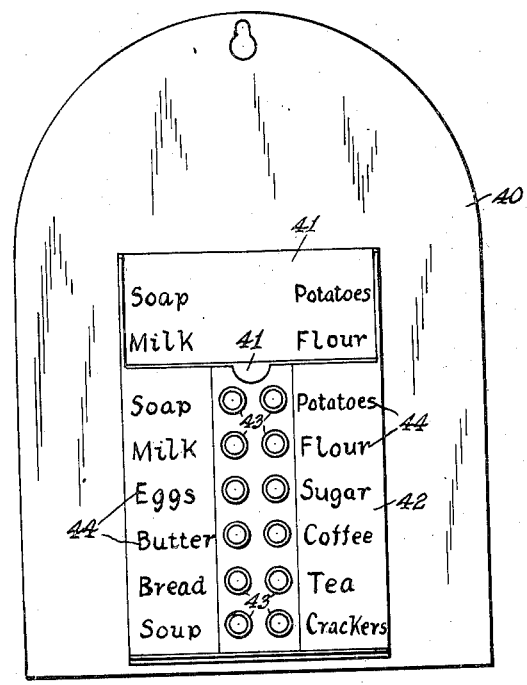
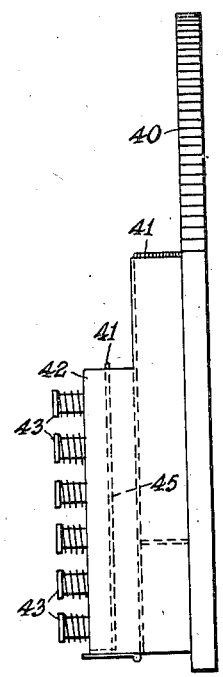
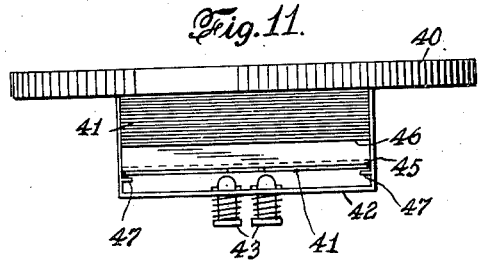
INVENTOR.
PETER A. BUCKY
BY
ATTORNEY.

Patented Mar. 8, 1949

2,463,514

UNITED STATES PATENT OFFICE 2,463,514

REMINDER DEVICE

Peter A. Bucky, Flushing, N. Y.

Application September 10, 1946, Serial No. 695,878

14 Claims. (Cl. 164—112)

The invention relates to reminder devices upon which items are to be listed from time to time until it is desired to make use of the accumulated listings as, for example, in the case of a housewife making purchases in conformity with this previously prepared list of various items. It is understood, of course, that the particular nature of the items noted on a reminder device will be in accordance with the field in which the device is to be utilized.

It is an object of the invention to provide a reminder device of this nature which will be simple both in construction and in operation; and whereby it is possible to withdraw at will a suitably punched memorandum of items which have been listed thereon from time to time.

A further object of the invention is to provide a device embodying punching means which, when operated for any particular item, will reveal to the operator then and at any subsequent time that a suitable indication has been made of such particular item.

In carrying out the invention, provision is made to mount within a casing or suitable housing means a punchable element such as a strip of paper or a card upon the surface of which are printed or otherwise applied indicia setting forth, preferably in columns, the desired list of items which one might wish to be reminded of in making purchase or for other purposes.

This punchable element is arranged to have openings punched therein in association with the respective indicia, the same being accomplished by a plurality of independently operable tubular punching means which are also associated with corresponding indicia located on the outer portion of the casing and are manually operable externally of said casing for cutting the openings in the punchable element. When this occurs, the opening cut out will reveal a background or indicator member, which may be in color contrasting with that of the punchable element or may have a reflective surface, thereby affording an indication of the listing of the particular item corresponding to the punching element operated and identified by the surface indicium.

The nature of the invention, however, will best be understood when described in connection with the accompanying drawings, in which:

Fig. 1 is a front elevation, partly in section, of the novel reminder device.

Fig. 2 is a side elevation thereof, and Fig. 3 is a vertical section, taken on the line 3—3, Fig. 1 of the drawings, and looking in the direction of the arrows.

Fig. 4 and 5 are horizontal sections, taken on the lines 4—4 and 5—5, respectively, Fig. 1 of the drawings, and looking in the direction of the arrows.

Fig. 6 is a fragmentary transverse section taken on the line 6—6, Fig 1; and Fig. 7 is a fragmentary side elevation illustrating the strip release mechanism, both views being shown on an enlarged scale.

Fig. 8 is a fragmentary longitudinal section, on an enlarged scale, of a modified form of punching element.

Fig. 9 is a front elevation and Fig. 10 a side elevation illustrating a modified form of the device.

Fig. 11 is a plan view thereof.

Referring to the drawing, 10 designates a casing designed to house mechanism hereinafter described, as well as a roll of strip material 11, which roll is rotatably mounted, preferably, in the upper portion of the housing; and the said portion to the remainder to admit hinged, for example, to the remainder to admit of ready access to the interior for the purpose of replenishing the supply of material. The said strip bears longitudinally thereof a succession of similar groupings of indicia 12 which are arranged parallel to one another and, preferably, in two columns, as shown. The particular indicia provided will, of course, depend upon the nature of the use to which the novel reminder device is to be put; and, in the embodiment shown and described, said device is intended for use as a kitchen reminder whereby a housewife may conveniently register from time to time the items which it is desired to purchase at some subsequent time. Punchings are to this end effective in the strip opposite the selected items and as will hereinafter be more fully set forth.

When the punched strip section is to be withdrawn from the casing for use, the same is manually drawn out of said casing, for example, through a slot 13 in the bottom thereof and over an edge 14 designed to sever conveniently a predetermined length or section of the strip. A notch 15, for example, is provided along the lower edge of the casing slot to allow of grasping the material to pull it downwardly a limited and predetermined extent each time it is desired to make use of a punched section.

The outer surface 16 of the casing 10 bears parallel indicia 17, in the embodiment shown, arranged in two columns and designed to correspond with the strip indicia 12 which advance section by section beneath the casing surface for juxtaposition with respect to the said indicia 17.

Beside each indicium 17 is located a punching element 18, these being arranged in columns as shown and, for example, between the two columns of indicia 17. The said punching elements are slidably mounted on the casing for axial movement therein, but each is normally maintained extended above the outer surface by a helical spring 19 located about a tubular punching element between said surface and an end flange or turned-over edge 20 of the element. Outward movement of an element is limited by engagement of a pin 21 extending radially from the inner end of the element and contacting the under surface of the casing, as is more clearly indicated in Fig. 3 of the drawings. If desired, the respective outer ends of a punching element may be closed by a transparent cap 22, Fig. 8, which may be of plastic material. Each punching element 18 terminates at its inner end in a cutting edge designed to coact, when the element is depressed in opposition to spring 19, for example by exerting pressure manually upon its outer protruding end, with a perforated or die plate 23 located within and fixed to the casing a slight distance behind the inner ends of the various elements which all terminate in a common plane. The degree of displacement of said die plate should be sufficient to permit the strip 11 normally to pass freely between the inner ends and the plate, said strip being guided to this end in suitable lateral guides 24 of the casing.

The back wall 25 of said casing, furthermore, affords a background indicator element or portion 26 behind the die plate juxtaposed to the said inner ends of the tubular punching elements so that when an opening 27 has been punched in the strip at a selected point, the background is exposed and is revealed in part at the outer end of a corresponding tubular punching element. This will indicate for a particular section of strip that note has been made on the strip regarding a particular item as designated by the corresponding indicium on the outer surface.

The background portion 26 may be of the nature of a reflective surface integral with the back wall member or attached thereto; or, it may be of a color contrasting with that of the strip, this serving to display effectively externally of the casing information as to the items marked. It may be recessed into the back wall 25, as shown, to afford ample discharge space and is continued to the casing bottom for closure thereat by a spring flap 28 which may be readily opened to discharge strip portions cut out by the punching elements when a quantity of the same has accumulated.

In order to insure each time of withdrawal of like sections of strip, provision, for example, is made to pass the strip which is provided along each side with a series of evenly spaced perforations 30, over a pair of sprocket wheels 31 which is mounted to rotate with the shaft 32. The latter telescopes with respect to a further and release shaft 33 extending out through the said casing 10 where it terminates in a knob 34 whereby it may be manually pulled outwardly in opposition to a spring 35 coiled thereover and located between an inner flange 36 of said shaft and a bearing 37 extending from wall 25.

This will normally maintain the telescopic relationship such that a pin 38 projecting radially from the sprocket shaft 32 remains in engagement with the longitudinal slot 39 directed inwardly from the inner end of shaft 33. Such engagement prevents rotation of the sprocket shaft and thereby any advance of the strip when it attempted to pull the same downwardly manually; and it is only when the pin is freed by pulling shaft 33 outwardly that the strip may advance. The knob is to be immediately release then and when the pin in its rotation again juxtaposed to the slot reengagement is again effected, and automatically under the influence of spring 35, to block further rotation of the sprocket shaft.

In operating the device with cards, bearing the desired indicia, rather than with a continuous strip, the hereinbefore described mechanism for insuring withdrawal of like sections of said strip will, of course, be unnecessary, an individual card being designed to be manually positioned and when suitably punched withdrawn, also manually. Thus, reference being had to Figures 9 to 11 inclusive, the back wall 40 may be provided, for example, at its upper front portion with a pocket or rack for storing conveniently a supply of the cards 41 to be utilized in the device, the punching mechanism for a said card being then located in front of the same. The said punching mechanism is similar in all respects to that hereinbefore described in connection with the device disclosed in Figs. 1 to 7, and comprises the casing plate 42 on the outer surface of which the tubular punching elements 43 are mounted, which surface bears also the desired indicia 44. The respective inner ends of these punching elements cooperate with a perforated die plate 45 behind which is the background area 46.

However, the bottom of the space between the casing plate 42 and the die plate 45 is closed in this instance to afford a support for a card 41 which is to be inserted manually through a guide 47 at the top of the casing plate. When the desired listings have been effected on said card by operation of the corresponding punching elements, the card may be withdrawn manually and a new unpunched one inserted for subsequent use.

I claim:

1. A reminder device, comprising supporting means for a punchable element bearing indicia, tubular punching means juxtaposed thereto for cutting out independent openings in said element in juxtaposition to its respective indicia, together with a background element juxtaposed to the cutting end of a punching means to be revealed through the other end thereof when an opening has been cut in the said punchable element.

2. The reminder device of claim 1, wherein the punchable element is a strip of movable material.

3. The reminder device of claim 1, wherein the punchable element and the background element are in contrasting colors.

4. The reminder device of claim 1, wherein the background element is constituted as a reflecting surface.

5. The reminder device of claim 1, wherein a transparent cap closes the outer end of a punching means.

6. The reminder device of claim 1, wherein a pocket is provided behind the punching means to receive punchings, and a closure element normally seals the bottom of said pocket.

7. The reminder device of claim 1, wherein the punchable element is a card, a pocket is provided to receive the card, and the punching means are adapted to extend through the said pocket to punch a card located therein.

8. A reminder device, comprising a casing bearing parallel arranged indicia on an outer surface and having a slot at one end, an indicia-bearing strip mounted within the casing bearing indicia arranged thereon similarly to those of the outer surface and alignable therewith, means to permit advance intermittently of predetermined lengths of the strip through the casing and slot in a plane parallel to the outer surface, a plurality of tubular punching elements mounted on the casing with inner ends located between the strip and the indicia bearing surface and the outer ends extending above said surface, respective punching elements being aligned with corresponding indicia of said surface and being manually depressible toward the strip to cut an opening therein, and a background indicator element located behind the strip over the punchable areas of said strip to be exposed through the outer end of a punching element when an opening has been cut out thereby in the said strip.

9. The reminder device of claim 8, wherein the slot is provided with a cut-off edge for severing the strip.

10. The reminder device of claim 8, wherein the strip passes behind the outer surface of the casing between the indicia arranged thereon in two columns and the punching elements are located likewise in two columns, one along each of the indicia columns and aligned herewith.

11. The reminder device of claim 8, wherein the bottom edge of the casing is notched for exposure of a portion of the lower end of the strip to enable it to be grasped manually.

12. The reminder device of claim 8, wherein the strip is laterally perforated and rotatable sprocket means engage said perforations to permit advance of the strip, together with means for predetermining the extent of the rotation of the sprocket means each time in drawing down the strip manually.

13. The reminder device of claim 8, wherein the strip is laterally perforated and rotatable sprocket means engage said perforations to permit advance of the strip, and a shaft carries said sprocket means and telescopes with a release, axially-slidable shaft, the two shafts including coacting holding means whereby the rotation of the sprocket means shaft is normally prevented and until the release shaft is temporarily displaced axially to disengage said means.

14. The reminder device of claim 8, wherein the strip is laterally perforated and rotatable sprocket means engage said perforations to permit advance of the strip, and a shaft carries said sprocket means and telescopes with a release, axially-slidable shaft, the two shafts including coacting holding means whereby the rotation of the sprocket means shaft is normally prevented and until the release shaft is temporarily displaced axially to disengage said means, and a resilient means is provided to re-return the release shaft to its normal telescopic relationship.

PETER A. BUCKY.

REFERENCES CITED

The following references are of record in the file of this patent:

UNITED STATES PATENTS

| Number | Name | Date |
|---|---|---|
| 1,127,814 | Shanklin | Feb. 9, 1915 |
| 1,705,091 | Langford | Mar. 12, 1929 |
| 1,925,661 | Haveles | Sept. 5, 1933 |
| 2,131,601 | Taub | Sept. 27, 1938 |
| 2,174,088 | Jensen | Sept. 26, 1939 |
| 2,392,488 | Maccallum | Jan. 8, 1946 |